United States Patent [19]

Kaplan

[11] 4,253,423
[45] Mar. 3, 1981

[54] CAT SCRATCHING AND CLIMBING POST

[76] Inventor: Michael L. Kaplan, 45 Pond St., Marblehead, Mass. 01945

[21] Appl. No.: 52,132

[22] Filed: Jun. 26, 1979

[51] Int. Cl.³ .............................................. A01K 15/00
[52] U.S. Cl. ........................................................ 119/29
[58] Field of Search ............................. 119/1, 29, 157; 182/100, 133, 135; 272/110, 113, 112; D30/42, 44

[56] References Cited

U.S. PATENT DOCUMENTS

| 1,046,595 | 12/1912 | Hudson | 119/157 |
| 1,516,861 | 11/1924 | Le Valley | 119/157 |
| 2,005,817 | 6/1935 | Yoder | 119/29.5 |
| 2,438,731 | 3/1948 | Wedeking | 119/157 |
| 3,238,924 | 3/1966 | Fillbach | 119/157 |

Primary Examiner—Robert Peshock
Assistant Examiner—Robert P. Swiatek
Attorney, Agent, or Firm—Thompson, Birch, Gauthier & Samuels

[57] ABSTRACT

A vertically elongated column, either square or round in cross section, is covered by tightly wound rope which is wound in a helix around the column and is affixed thereto by glue and recessed nails. The column extends upwardly from a horizontal base. The rope is densely wrapped around the column so that none of the column surface is visible between adjacent loops of the rope.

5 Claims, 1 Drawing Figure

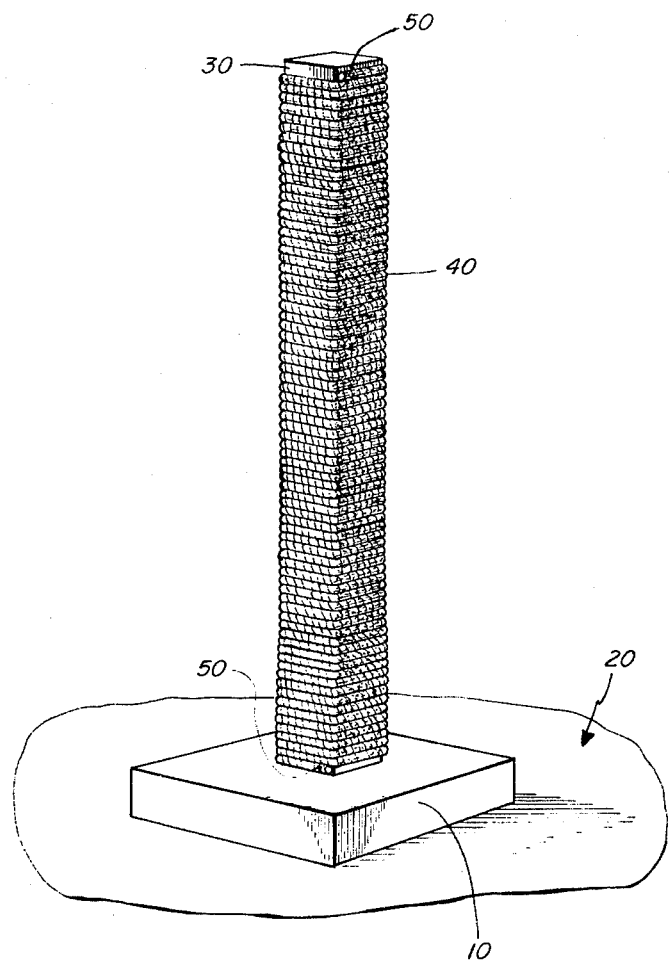

CAT SCRATCHING AND CLIMBING POST

BACKGROUND OF THE INVENTION

This invention generally pertains to the art of cat scratching and climbing posts, which are devices on which a cat may scratch to sharpen its claws or on which the cat may climb.

The art is replete with various devices which may be scratched by cats or climbed on by cats. Examples of the known art include U.S. Pat. Nos. 3,479,990 (Crow), 3,479,991 (Lichtenberger), 3,604,397 (Salerno), 3,993,027, (Mullin), 4,047,502 (Gordon), and 4,112,873 (Van Zandt). With the exception of Mullin's use of cardboard sheets, these devices use carpet as a covering material in order to facilitate use by cats. These devices have the disadvantage that cats do not, in general, actually make use of them. In this invention, a new covering material is used, which, by experimentation, has been shown to be effective in use and is actually attractive to cats. Because of its utility, this device is deemed to be distinguishable over the prior art.

SUMMARY OF THE INVENTION

Vertically elongated posts and poles have been commonly used to form devices upon which cats may scratch their claws or satisfy their climbing desires. These devices are commonly used to prevent cats from climbing on and destroying furniture. Conventionally, these devices are covered with carpet or cardboard so as to provide a surface which may be easily climbed, rather than having smooth surfaces which a cat's claws cannot easily grab.

These devices have the disadvantage that cats generally do not actually use them. The invention disclosed herein has the advantage that, by experiment, it has been demonstrated that cats actually use the device and therefore do not destroy household furniture.

In this invention, the covering material used is rope which is tightly wrapped around and secured to the post. This rope provides a surface which, by experiment, cats actually use for scratching and climbing.

BRIEF DESCRIPTION OF THE DRAWING

The single FIGURE is a perspective view of the invention as viewed from the side.

DETAILED DESCRIPTION OF PREFERRED EMBODIMENTS

A horizontal base 10, made of wood, rests on a floor 20. A vertical column 30, also made of wood, extends upwardly from base 10. The column may be round or square, etc. in cross-section. Here it is square.

Braided manila hemp rope 40, approximately ½ inch to ¾ inch in diameter, is helically coiled around the column, starting at the top and ending at the bottom. The windings of the rope are sufficiently dense so that each loop of rope is continuously in contact with an adjacent loop of rope so that the surface of the column is not visible. The rope is fixedly secured to the column by glue placed on the surface of the column and by nails 50 which extend through the rope and into the column near the ends of the rope. The nails are recessed into the rope to prevent their scratching the paws of cats which use the device.

It will be obvious to one skilled in the art that the column of this invention may be modified to have branches extending outwardly from the column at various points with or without platforms upon which cats may rest after climbing on to them. It will also be obvious to one skilled in the art that the column may extend between a floor and a ceiling in the manner of a spring-loaded pole lamp to provide added climbing height for the cats which use it.

The scope of this invention is intended to be limited only by the following claims.

I claim:
1. A portable scratching and climbing post for a cat comprising:
  (a) a horizontal base having a flat lower surface, said lower surface adapted to rest unattached on the underlying ground or floor;
  (b) a vertical elongated column attached to and extending upwardly from said horizontal base, the sides of said column being aperture-free;
  (c) said vertical column being free of lubricants, fluids, or the like within its interior;
  (d) said vertical column being a single unit having a cap-free upper end; and
  (e) an elongated length of dry unlubricated rope, said rope being helically wound around and fixed to the exterior side surface of said column, said rope extending from closely adjacent to said base to closely adjacent to said upper end, each helical loop of rope being closely spaced relative to its adjacent loops of rope.
2. The post of claim 1 wherein said rope is secured to the column by glue and recessed nails.
3. The post of claim 1 wherein said rope is wound in a manner that each helical loop of rope is continuously in contact with its adjacent loop of rope.
4. The post of claim 3 wherein said rope is of the braided type.
5. The post of claim 4 wherein said rope is of the manila hemp type.

* * * * *